(12) United States Patent
Williams et al.

(10) Patent No.: US 8,201,147 B2
(45) Date of Patent: Jun. 12, 2012

(54) GENERIC XAD PROCESSING MODEL

(75) Inventors: Antony Scott Williams, Mercer Island, WA (US); Christopher D. Hackmann, Redmond, WA (US); William Emeric Aitken, Mercer Island, WA (US); Simon David Kent, Redmond, WA (US); Vladimir Nedkov Hristov, Redmond, WA (US); Siddharth Jayadevan, Seattle, WA (US); Simeon J. Cran, Redmond, WA (US); Clemens A. Szyperski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 12/028,686

(22) Filed: Feb. 8, 2008

(65) Prior Publication Data

US 2009/0204944 A1    Aug. 13, 2009

(51) Int. Cl.
    *G06F 9/44* (2006.01)
(52) U.S. Cl. .................................................. 717/121
(58) Field of Classification Search ........................ None
    See application file for complete search history.

(56) References Cited

U.S. PATENT DOCUMENTS

| | | | |
|---|---|---|---|
| 6,083,276 A * | 7/2000 | Davidson et al. | 717/107 |
| 7,065,742 B1 | 6/2006 | Bogdan | |
| 2002/0099868 A1 * | 7/2002 | Cook et al. | 709/316 |
| 2003/0149934 A1 | 8/2003 | Worden | |
| 2004/0039993 A1 | 2/2004 | Kougiouris et al. | |
| 2006/0004729 A1 | 1/2006 | Zhilyaev et al. | |
| 2006/0089941 A1 | 4/2006 | Jenni et al. | |
| 2006/0129921 A1 | 6/2006 | Relyea et al. | |
| 2006/0242166 A1 | 10/2006 | Larcheveque et al. | |
| 2006/0248112 A1 | 11/2006 | Williams et al. | |
| 2006/0248450 A1 * | 11/2006 | Wittenberg et al. | 715/513 |
| 2009/0204944 A1 * | 8/2009 | Williams et al. | 717/121 |
| 2009/0288069 A1 * | 11/2009 | Kent et al. | 717/121 |

* cited by examiner

*Primary Examiner* — Philip Wang
(74) *Attorney, Agent, or Firm* — Workman Nydegger (57) ABSTRACT

Embodiments are directed to dynamically building software applications and dynamically updating software applications based on changed data values. In one embodiment, a computer system receives an indication that a software application is to be initiated. The computer system also receives an application description including tags describing software objects that are to be included in the software application, automatically maps portions of the application description identified by the tags to software objects using reflection, where the reflecting includes accessing properties associated with the software objects, and automatically binds properties of the software objects to the portions of the application description based declarative rules included in the software object properties associated with the software object.

20 Claims, 4 Drawing Sheets

GENERIC XAD PROCESSING MODEL

BACKGROUND

Computers have become highly integrated in the workforce, in the home, and in mobile devices. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Software applications are typically written using some type of high-level programming language. Although many languages are in use today, most fall into one of two categories: procedural and declarative languages. In procedural languages, the developer typically writes a series of statements, referred to as functions or routines, which are to be computationally carried out in sequence. Procedural languages may include ASP, PERL, Python and C, among others. Such languages generally require a high level detail regarding event handling and state changes. This is more pronounced in cases where the user interface changes as a result of various user inputs.

Declarative languages have alleviated some of this burden by allowing developers to generally specify how to handle certain events or state changes without having to write code for each specific situation. However, declarative languages often lack the dynamism to allow the declarative specification of rich data driven applications.

BRIEF SUMMARY

Embodiments described herein are directed to dynamically building software applications and dynamically updating software applications based on changed data values. In one embodiment, a computer system receives an indication that a software application is to be initiated. The computer system also receives an application description including tags describing software objects that are to be included in the software application. The computer system automatically maps portions of the application description identified by the tags to software objects using reflection, where the reflecting includes accessing properties associated with the software objects. The computer system automatically binds properties of the software objects based on portions of the application description that specify declarative rules indicating how a software object is to be bound to its associated properties.

In another embodiment, the computer system receives an indication that one or more data values in a dynamically configured software application has changed. The computer system automatically remaps tags specified in an application description to software objects using reflection, where the reflecting includes accessing properties associated with the software objects. The computer system automatically binds properties of the software objects to the portions of the application description based on declarative rules associated with the software objects. The computer system also reconfigures the software application using the as updated mappings and bindings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to dynamically building software applications and dynamically updating software applications based on changed data values. In one embodiment, a computer system receives an indication that a software application is to be initiated. The computer system also receives an application description including tags describing software objects that are to be included in the software application. The computer system automatically maps portions of the application description identified by the tags to software objects using reflection, where the reflecting includes accessing properties associated with the software objects. The computer system automatically binds properties of the software objects based on portions of the application description that specify declarative rules indicating how a software object is to be bound to its associated properties.

In another embodiment, the computer system receives an indication that one or more data values in a dynamically configured software application has changed. The computer system automatically remaps tags specified in an application description to software objects using reflection, where the reflecting includes accessing properties associated with the software objects. The computer system automatically binds properties of the software objects to the portions of the application description based on declarative rules associated with the software objects. The computer system also reconfigures the software application using the as updated mappings and bindings and displays the reconfigured software application including the changed data values. In some cases, as will be explained in greater detail below, one or more of the aforementioned computer system actions may be performed as a result of determining the most granular set of changes that minimizes reconstruction of objects and minimizes re-setting of software object properties.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of as implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
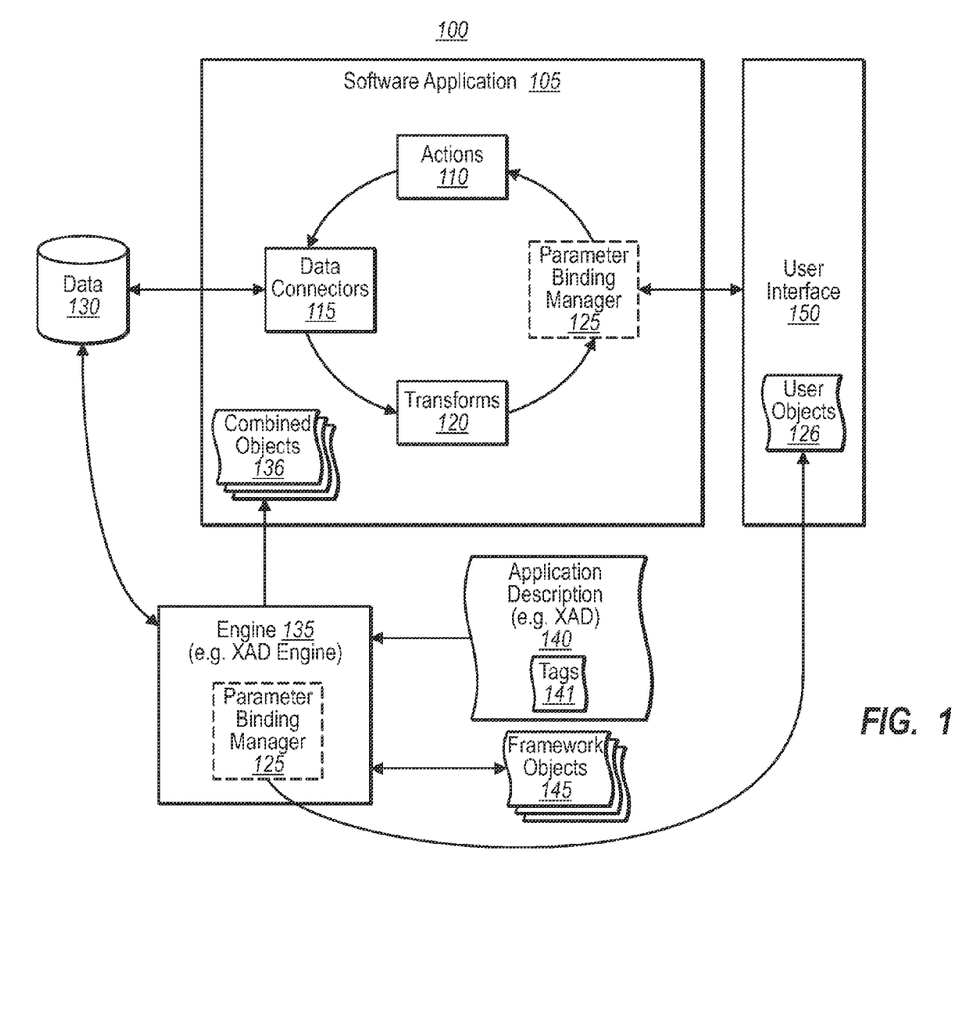
FIG. 1 illustrates a component architecture in which embodiments of the present invention may operate including dynamically building a software application and dynamically updating a software application as a result of changed data values.

FIG. 1 illustrates a computer architecture 100 in which the principles of the present invention may be employed. In some embodiments, the elements of FIG. 1 may be implemented in or otherwise be a part of a computer system. User interface 150 may be any type of textual, graphical or other type of user interface. User interface (UI) 150 may be configured to display portions of software application 105. Additionally or alternatively, UI 150 may display user objects 126. User objects may include buttons, windows, links, graphics, icons or other graphical objects. In some cases, user objects may act as labels or indicators of underlying functionality provided by software application 105.

Application 105 may be any type of software application, designed for any purpose. The application may include multiple components or only a single component. In some cases, application 105 may be generated, compiled or stitched together at runtime. Engine 135, may be configured to perform all or a portion of the as generation, compilation or stitching together. These functions may also be performed by engine 135 at some other time before runtime. Engine 135 may be configured to receive application description portions 140 including tags 141. In some embodiments, application description portions 140 may include various software objects which may be used to create a working software application. The software objects may be tagged with tags 141 which declaratively indicate how the software objects are to be used, individually and in conjunction with other software objects. Such software objects may form the basis for various portions of software application functionality and may be declaratively stitched together by engine 135, as indicated above.

Engine 135 may also be configured to receive framework objects 145. Framework objects may include any of user objects 126 as well as other application-oriented framework portions used in generating a software application. This may include libraries, bindings or other objects. Engine 135 may include parameter binding manager 125. Parameter binding manager 125 may be configured to access application description portions 140 including one or more software objects and tags 141. Manager 125 may map portions of the application description identified by the tags to various software objects using reflection. Reflection, as used herein, includes accessing properties associated with the software objects, which in some cases, involves viewing metadata associated with the software objects. Parameter binding manager 125 may also be configured to bind the software objects' properties to various portions of the application description based on different declarative rules included in the software object properties associated with the software object. The full functionality of the parameter binding manager will be explained in greater detail below.

Engine 135 may be further configured to access data 130 and generate combined objects 136. Data 130 may be any type of information usable by engine 135 to generate software application 105. Moreover, data 130 may be accessible by application 105 on an ongoing basis. Thus, as a user interacts with application 105, data may be streamed or otherwise sent to either or both of application 105 and engine 135. Combined objects 136 indicates one or more software objects stitched together or otherwise combined by engine 135. In some cases, combined objects 136 may form the basis of software application 105 or may themselves comprise application 105.

Software application 105 may be continually updated and altered as a result of a passage of time or due to interaction from a user or other application. For example, some action may occur (e.g. action 110) that indicates that software application 105 is to be modified. In some cases, this action may be a change in data. Such a change in data may indicate to engine 135 that the change in data is to be translated into changes to the software application. Data connectors 115 may be used to identify which data is to be modified and may be configured to communicate with data 130 to retrieve the updated information. Transforms 120 may be used to transform, reformat, or otherwise modify the retrieved data before transferring it to parameter binding manager 125. Parameter binding manager 125, although shown as part of engine 135, may also play an integral role as part of application 105 including remapping various tags and binding software object properties to portions of application description 140. Parameter binding manager 125 may also be configured to interact directly with user interface 150, providing UI 150 with updated information that is to be displayed to a computer user.

As indicated in FIG. 1, engine 135 may be a XAD engine. XAD, short for extensible markup language (XML) Application Framework (XAF) Application as Definition (XAD) language, is a declarative or descriptive language. In some cases, XAD may be used to author XAF applications (e.g. application 105) based on the XAF platform. In some cases, XAD may indicate how to create a runtime object graph based on user-configurable construction information and/or application description portions 140. A XAD engine (e.g. engine 135), in conjunction with parameter binding manager 125, may process or execute the application description to create objects which view and/or process data. Thus, XAD may be used within the application framework to provide a standard and simple means of stating actions or other occurrences within the framework.

Using XAD, in some cases, a developer may be able to avoid writing the actual code for the objects that do the data processing. For example, the developer may only need to write the files for the declarative application that are ultimately compiled and executed. Furthermore, XAD offers progressive levels of abstraction to assist in design, strong typing, a high degree of static checking, and a high degree of extensibility. XAD also allows manipulation of heterogeneous data. Although XAF and XAD are mentioned herein and may be incorporated in one or more embodiments, it will be understood by one skilled in the art that functionality provided by either or both of XAD and XAF may additionally or alternatively be provided by other software applications, computer systems, or functionality providing entities.

XAF, as used herein, is a software application framework for generating a runtime structure for a given software application and for managing execution of the software application. Application 105 may be generated by an application framework that includes a collection or graph of connected application components. Functionalities of an application configured according to the application framework as are enabled by dynamically configuring groups of application components into component domains where each domain is configured to enable a given functionality of the application, for example, displaying a picture in a word processing document.

In order to generate a runtime structure for the application, an application may pass an application description for each piece of application functionality to an application description engine. The application description provides declarative rules for structuring and composing the component domains, and the application description engine is operative to interpret the declarative rules for creating and reconfiguring the component domains as required based on data events received by the application. Data events, as used herein, may be any type of software message, user input, or other indication that something has occurred that may affect the software application. Data events may occur, for example, when a user clicks a mouse to interact with the application, or when an error message is presented during processing of the application.

In some cases, XAF may be configured to track dependencies such that data evaluations and object graph constructions may be incrementally updated when data changes. For example, XAF may track dependencies in data 130 such that software application 105 may be incrementally updated when data 130 is updated. In some embodiments, this incremental updating is carried out automatically by XAF In some embodiments, as outlined in FIGS. 1 and 2, engine 135 may invoke a builder associated with application 105's entry point. This results in one or more objects being created, and possibly some objects being registered for initialization. These initializations may be performed, which may result in more builders being invoked, which may result in more objects being created, and perhaps more objects being registered for initialization. In some cases, as long as there are as objects registered for initialization, engine 135 will continue to initialize them. Engine 135 may then be cycled, after which the main loop of the application may be entered.

Figure 2:
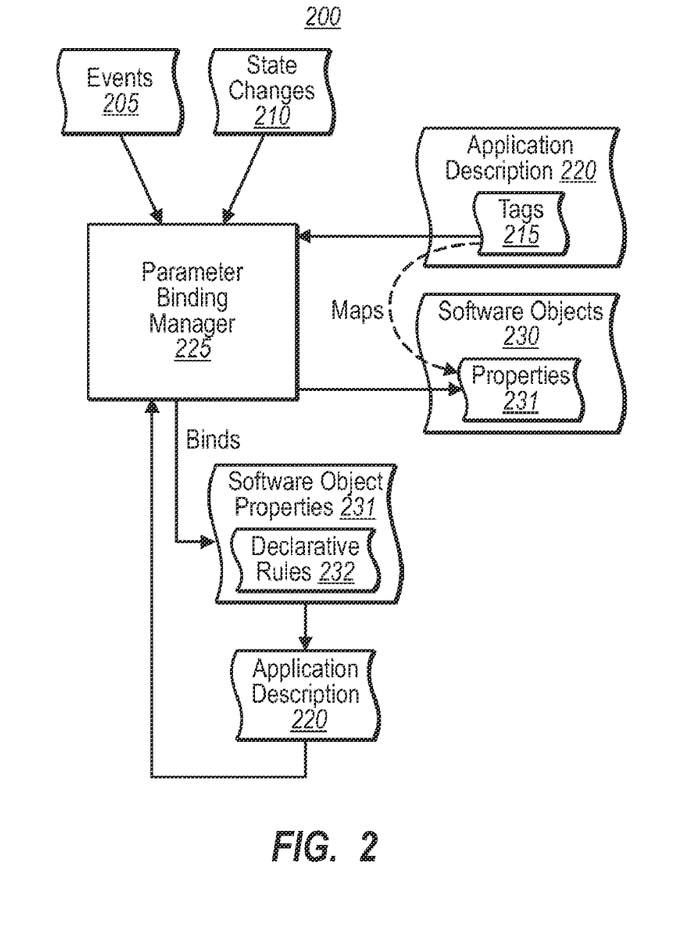
FIG. 2 illustrates a component architecture illustrating various interactions with the parameter binding manager.

In some cases, the main loop of the application first revalidates dependency domains that require revalidation. Here, this is done in top down order. As a result, additionally builders may be called, objects may be registered for initialization, and nested lifetime domains may be shut down. Nested lifetime domains, as used herein, describe a nested hierarchy of collections of objects that dictate certain actions that are to be taken on shutdown for that collection of objects. In some cases, when lifetime domains are shut down, nested dependency domains are similarly shut down. Thus, top-down revalidation may avoid revalidating domains that would otherwise be shut down anyway. Any pending initializations may then be performed. In some cases, it is possible to interleave initialization and revalidation, as long as care is taken to ensure that no ancestor domain requires either initialization or revalidation before initializing or revalidating a higher-level domain.

As shown in FIG. 2, parameter binding manager 225 may map object tags 215 in application description 220 to properties 231 of software objects 230. Parameter binding manager 225 may be further configured to bind software object properties 231 to application description portions 220 using one or more declarative rules 232. If external data changes (e.g. data 130), data connectors 115 can trigger an engine 135 cycle so that the changes can be reflected in the data flow. Data flow, as used herein, involves data elements whose values depend on the values of other data elements. Thus, in a data flow, when the value of one data element changes, the values of elements whose values depend on that element will change as a result.

In some cases, this may result in one or more object dependencies becoming invalid. This, in turn, may raise an event (e.g. event 205). Events and other as state changes (210) may be handled by parameter binding manager 225. Parameter binding manager 225 may hold a target object and a collection of pairs including a parameter binder and a value provided by application description 220 (e.g. XAD) for the parameter. Parameter binding manager runs through these pairs and, for each pair, determines whether a new value needs to be bound to the target object. The manager maps the provided value to an object of the appropriate type, and updates the target object appropriately. In some cases, during the first cycle, the parameter binding manger updates all provided parameters. Thereafter, the manager only updates when the object has changed.

As mentioned above, parameter binding manager 225 may be configured to perform mapping and binding operations. More specifically, parameter binding manager 225 may be configured to automatically map application description portions 220 identified by tags 215 to software objects 230 using reflection. Reflection involves accessing properties associated with software objects (e.g. properties 231). In some cases, the properties may be stored in metadata associated with the object. Such properties may be updated and reflection may be used to obtain the most up-to-date version of the object's properties. Thus, because parameter binding manager 225 is configured to automatically perform such mappings, developers may avoid hard-coding such mappings one at a time for each object. Parameter binding manager 225 may use dynamic updates to perform the automatic mapping based on the updated information. Parameter binding manager 225 may also be configured to automatically map tags 215 to the properties of new software objects with which the manager was not previously familiar. This functionality allows for a great deal of dynamism as software objects of any type may be automatically mapped by manager 225. Furthermore, manager 225 allows developers to access a greater amount functionality as without writing more code.

Parameter binding manager 225 is also configured to automatically bind software object properties 231 to application description portions 220 based on declarative rules 232 included in software object properties 231. Such automatic binding similarly allows a developer to add functionality to a software application without having to hard-code object bindings. Manager 225 may dynamically bind new and custom objects without being specifically programmed to deal with those objects. Such dynamism allows objects to be added automatically and at will. Furthermore, the object properties may be bound using the aforementioned declarative rules without a great deal of (or in some cases any) interaction from the developer. This, and other parameter binding manager functionality will be explained in greater detail below with regard to FIGS. 3 and 4.

Figure 3:
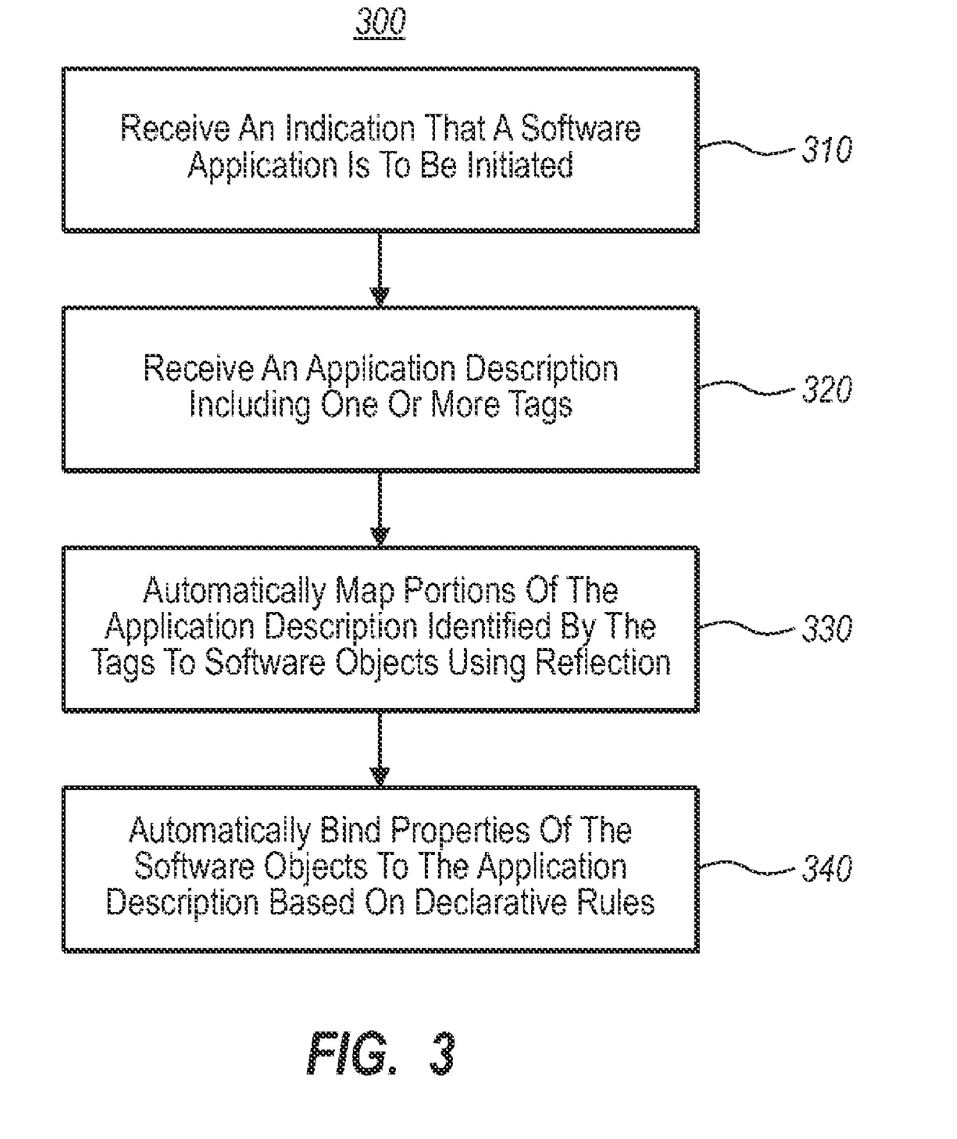
FIG. 3 illustrates a flowchart of an example method for dynamically building a software application.

FIG. 3 illustrates a flowchart of a method 300 for dynamically building a software application. The method 300 will now be described with frequent reference to the components and data of environments 100 and 200 of FIGS. 1 and 2, respectively.

Method 300 includes an act of receiving an indication that a software application is to be initiated (act 310). For example, engine 135 may receive an indication that software application 105 is to be initiated. Engine 135 may interpret such an indication as a command to generate the application from one or more component pieces, as defined by application description portions 140.

Method 300 includes an act of receiving an application description including one or more tags describing software objects that are to be included in the software application (act 320). For example, engine 135 may receive application description portions 140 including tags 141 describing software objects that are to be as included in software application 105. Tags 141 may include various types of tags including data provider tags, switch tags and repeater tags.

Data provider tags include information describing allowable parameters. The parameters are determined by enumerating the public properties of a class of objects (e.g. common language runtime (CLR) class objects). In some cases, the name of the parameter is the name of the property. The tag may include a return type which is obtained by searching for a public property in the class object attributes. During the execution of a builder, a data provider tag may indicate a series of actions to take.

For example, an instance of the data provider class may be created by calling its default constructor using reflection. A binding structure may also be created that establishes a mapping between parameter names and the corresponding value for each parameter specified in the application description (e.g. XAD) source. The data provider object may be registered with engine 135, providing such a binding structure as an argument. This results in a value provider that shares the value of the tag. Additionally or alternatively, engine 135 may arrange that on shutdown of the current lifetime domain, the data provider may be unregistered from the engine. In some cases, engine 135 ensures that no attempt is made to process a data provider tag until all of its parameters have values.

Although CLR class objects are mentioned in the above example, other software objects such as Java objects, or other portions of managed or unmanaged code may also be used. In some cases, tags 141 may include a switch tag. The switch tag may allow a user to declaratively specify that the content of an element is to be changed in response to a change in data. For example, a user may declaratively specify that the content of a UI element such as a button is to be changed in response to a change in application data. Tags 141 may additionally or alternatively include a as system level repeater tag. System level repeater tags may allow the specification of a sequence of objects by specifying a sequence of data that corresponds to the sequence of objects. Thus, for example, engine 135 may be configured to access a repeater tag to generate a sequence of objects based on the specified sequence of data. Parameter binding manager 125 may be used to bind the sequence of objects as specified by the repeater tag, where various dependencies associated with the software object properties are propagated using the repeater tag.

Method 300 includes an act of automatically mapping portions of the application description identified by the tags to one or more software objects using reflection, the reflecting including accessing properties associated with the software objects (act 330). For example, parameter binding manager 125 may map application description portions 140 identified by tags 141 to one or more software objects using reflection. The reflection may include accessing properties associated with the software objects. In some embodiments, reflection may be used in the process of mapping a class or function defined by a CLR class object. For example, to map an XML name to a class, the (XML) namespace component of the name may be mapped to one or more pairs consisting of a CLR namespace and a CLR class object. The local name component of the tag name may be used as a class name. For each assembly-namespace pair, reflection may be used to look up a definition of the named class in the namespace in the named assembly. In some cases, if exactly one of these lookups succeeds, the resulting class is returned; otherwise an error is returned.

In some embodiments, engine 135 may determine, based on the accessed properties associated with the software objects (accessed during reflection), which parameters can be used with the tags. Engine 135 may further determine, based on the above determination, which types of entities are permissible as values for those as parameters. Moreover, engine 135 may generate one or more entities corresponding to an entity type determined to be permissible for the determined appropriate parameters. Thus, for a given set of parameters, engine 135 may determine which values are appropriate for a given entity type and generate entities based on those values.

Method 300 includes an act of automatically binding properties of the software objects to the portions of the application description based on one or more declarative rules included in the software object properties associated with the software object (act 340). For example, parameter binding manager 135 may automatically bind software object properties 231 to application description portions 220 based on declarative rules 232 included in software object properties 231 associated with software objects 230. In some cases, engine 135 may be configured to build a full object graph based on software objects 230 of application description 220, including any properties 231 bound to the software objects. Furthermore, in some cases, the software object properties may be automatically bound to one or more arbitrary expressions, or other software functions.

Figure 4:
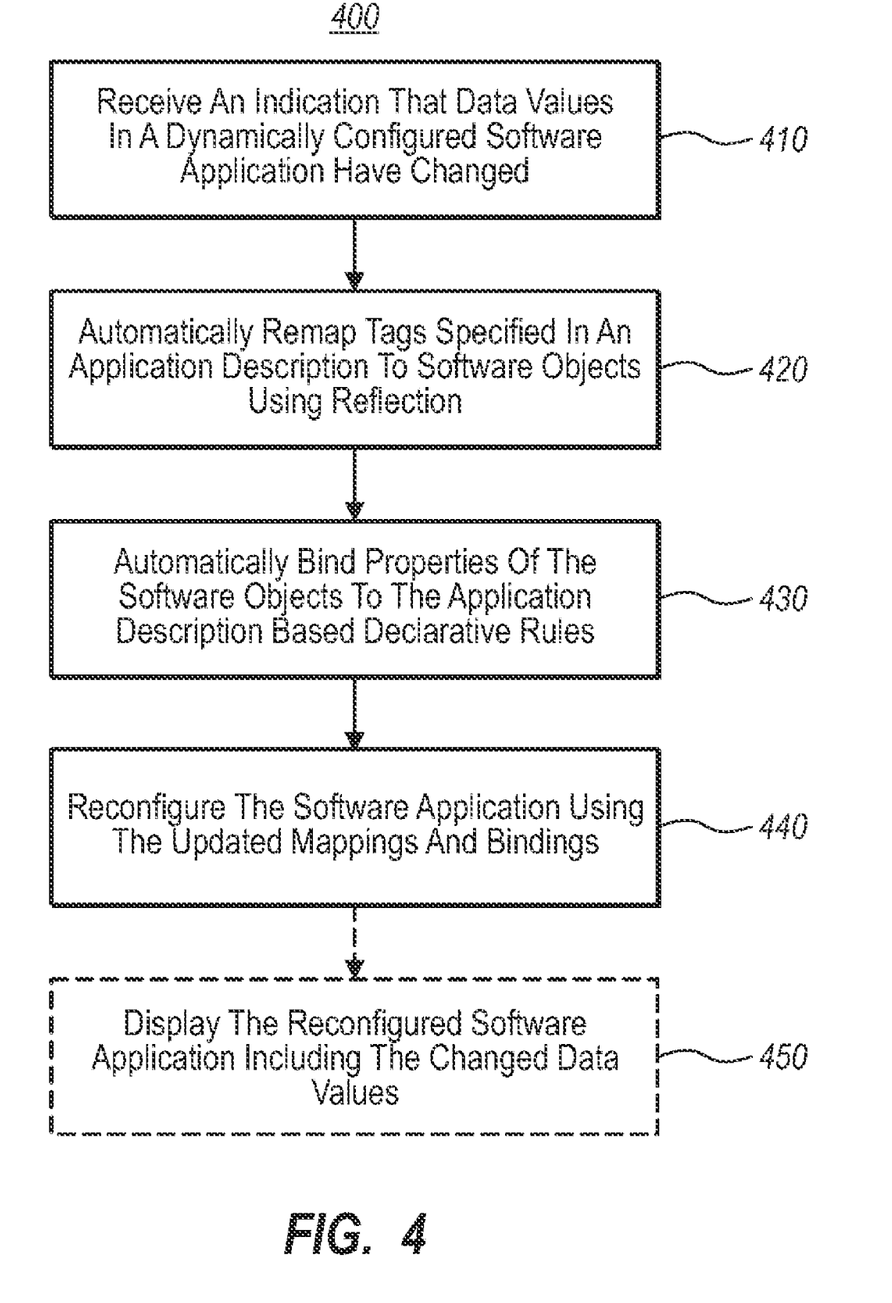
FIG. 4 illustrates a flowchart of an example method for dynamically updating a software application as a result of changed data values.

FIG. 4 illustrates a flowchart of a method 400 for dynamically updating a software application as a result of changed data values. The method 400 will now be described with frequent reference to the components and data of environments 100 and 200 of FIGS. 1 and 2, respectively.

Method 400 includes an act of receiving an indication that one or more data values in a dynamically configured software application have changed (act 410). For example, engine 135 may receive an indication that one or more data values in dynamically configured software application 105 have changed. In some cases, data connectors 115 may indicate that data has changed. Parameter binding manager 125 as may, additionally or alternatively, be configured to receive an indication that data values have changed or that events 205 or state changes 210 have occurred that would indicate that one or more changes are to be implemented in software application 105.

Method 400 includes an act of automatically remapping tags specified in an application description to one or more software objects using reflection, the reflecting including accessing properties associated with the software objects (act 420). For example, parameter binding manager 125 may automatically remap tags 141 specified in application description 140 to one or more software objects using reflection. As indicated above, reflection may include accessing properties associated with the software objects (e.g. properties 231). In some cases, one of the properties is a set property that accepts a list of software objects. In such cases, a repeater construct may be used with the set property to generate one or more entities. Furthermore, as indicated above, software objects may be CLR class objects, Java objects, or any other type of managed or unmanaged code. Software object properties 231 may also include a parameter pair. The parameter pair may include a property value and a logical relationship indicator such as parent, child, sibling or other relationship indicator.

Method 400 includes an act of automatically binding properties of the software objects to the portions of the application description based on one or more rules associated with the software objects (act 430). For example, parameter binding manager 125 may automatically bind software object properties 231 of application description portions 140 based on declarative rules 232 associated with software objects 230. In some cases, the declarative rules may indicate settings or parameters within which the software object properties are to be bound.

Method 400 includes an act of reconfiguring the software application using as the updated mappings and bindings (act 440). For example, engine 135 may reconfigure software application 105 using the updated mappings and bindings performed by the parameter binding manager. In some cases, engine 135 may update only those portions of data that have changed, and, as a result, those software objects that encompass those data values. In other cases, engine 135 may reconfigure or regenerate software application 105 from scratch, based on the new data values and the updated mappings and bindings. In some embodiments, reconfiguring software application 105 may include applying the bindings in a well defined order. For example, reconfiguring software application 105 may apply the bindings in a top-down manner, such that properties of root objects, as indicated by a logical relationship indicator, are bound first and child objects, as indicated by the logical relationship indicator, are bound subsequently thereafter, such that all objects are updated consistently.

In some embodiments, one or more of the acts of method 400 may be performed as a result of determining the most granular set of changes (in some cases, required changes) that minimizes reconstruction of objects and minimizes re-setting of software object properties. By minimizing object reconstruction and minimizing software property re-setting, increased efficiencies in performing the various acts may be observed. In some cases, such a granular reconstruction (using the determined set of changes) may be achieved by a combination of maintaining data identity and diffing values.

Method 400 also includes an optional act of displaying the reconfigured software application including the changed data values (act 450). For example, as a result of the reconfiguration of the software application, a computer system monitor or other viewing apparatus may be used to display reconfigured software application 105 including the changed data values. In some cases, changes made to the data values may be displayed on the fly, as changes to the data values are implemented by engine 135. Such a technique may allow for declarative changes and provide dynamism to arbitrary classes without having prior knowledge of the classes. Thus, a user may be able to instantiate any object (including CLR class objects, .NET or other objects), bind the objects to various properties or property values, and update the objects and/or the software application based on those properties, as desired by the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system comprising one or more processors and memory storing executable instructions that implement a declarative language framework for building software applications from declarative language application descriptions, a method for dynamically building a software application from a declarative language application description, the method comprising:

an act of receiving, at the declarative framework, an indication that a software application is to be initiated;

an act of receiving, at the declarative framework, a declarative language application description, the declarative language description comprising one or more tags in a declarative language that each contain one or more parameters to be mapped to properties of a class object that is to be included in the software application;

an act of the declarative framework using reflection to identify, at runtime, properties of a plurality of candidate class objects that could be used to implement functionality defined in each tag;

an act of the declarative framework selecting one of the plurality of candidate class objects for each tag, each selected class object having properties that match the one or more parameters defined in the corresponding tag;

an act of the declarative framework automatically mapping the parameters in each of the tags to the corresponding selected class object; and an act of automatically binding the properties of the selected class object to the parameters of the corresponding tag based on one or more declarative rules associated with the properties.

2. The method of claim 1, further comprising building a full object graph of the class objects identified for each tag of the declarative language application description, including the properties bound to the parameters.

3. The method of claim 1, wherein at least one of the tags comprises a switch tag, the switch tag allowing a user to declaratively specify that the content of an element is to be changed in response to a change in data.

4. The method of claim 1, wherein the class objects are common language runtime (CLR) class objects.

5. The method of claim 1, further comprising an act of determining, based on the accessed properties associated with the software objects, which parameters can be used with the tags.

6. The method of claim 5, further comprising determining, based on the parameters determined to be appropriate for the tags, which types of entities are permissible as values for these parameters.

7. The method of claim 6, further comprising an act of generating one or more entities corresponding to an entity type determined to be permissible for the determined appropriate parameters.

8. The method of claim 1, wherein at least one of the tags is a system level repeater tag.

9. The method of claim 8, wherein the system level repeater tag allows the specification of a sequence of objects by specifying a sequence of data that corresponds to the sequence of objects.

10. The method of claim 9, further comprising binding the sequence of data to the sequence of objects as specified by the repeater tag.

11. The method of claim 1, wherein the act of automatically binding the properties of the selected class objects to the parameters of the corresponding tag based on one or more declarative rules associated with the properties comprises automatically binding the properties of the selected class objects to one or more arbitrary expressions.

12. The method of claim 1, further comprising building a full object graph of the class objects identified for each tag of the declarative language application description, including) The method of claim 8, wherein one or more dependencies associated with the properties is propagated using the repeater tag.

13. At a computer system comprising one or more processors and memory storing executable instructions that implement a declarative language framework for building software applications from declarative language application descriptions, a method for dynamically updating a software application, that was built from a declarative language application description, as a result of changed data values, the method comprising:

an act of receiving, at the declarative framework, an indication that one or more parameters of one or more tags in a dynamically configured software application have changed, the software application being dynamically configured from a declarative language application description that includes tags that each contain one or more parameters;

an act of the declarative framework using reflection to identify, at runtime, properties of a plurality of candidate class objects that could be used to implement functionality defined in each tag;

an act of the declarative framework selecting one of the plurality of candidate class objects for each tag, each selected class object having properties that match the one or more parameters defined in the corresponding tag;

an act of the declarative framework automatically mapping the parameters in each of the tags to the corresponding selected class object; and an act of automatically binding the properties of the selected class object to the parameters of the corresponding tag based on one or more declarative rules associated with the properties; and an act of reconfiguring the software application using the updated mappings and bindings.

14. The method of claim 1, further comprising building a full object graph of the class objects identified for each tag of the declarative language application description, including) The method of claim 13, further comprising, as a result of the reconfiguration of the software application, an act of displaying the reconfigured software application including the changed parameters.

15. The method of claim 13, wherein at least one of the properties is a set property that accepts a list of software objects.

16. The method of claim 15, further comprising using a repeater construct with the set property to generate one or more entities.

17. The method of claim 13, wherein the class objects are common language runtime (CLR) class objects.

18. The method of claim 13, wherein at least one of the properties includes a parameter pair, the parameter pair including a property value and a logical relationship indicator.

19. The method of claim 18, wherein the act of reconfiguring the software application using the updated mappings and bindings comprises applying the bindings in a top-down manner, such that properties of root objects, as indicated by the logical relationship indicator, are bound first and child objects, as indicated by the logical relationship indicator, are bound subsequently thereafter such that all objects are updated consistently.

20. A computer program product for implementing a method for dynamically building a software application, the computer program product comprising one or more physical storage media having stored thereon computer-executable instructions that, when executed by one or more processors of the computing system, cause the computing system to perform the method, the method comprising:

an act of receiving, at the declarative framework, an indication that a software application is to be initiated;

an act of receiving, at the declarative framework, a declarative language application description, the declarative language description comprising one or more tags in a declarative language that each contain one or more parameters to be mapped to properties of a class object that is to be included in the software application;

an act of the declarative framework using reflection to identify, at runtime, properties of a plurality of candidate class objects that could be used to implement functionality defined in each tag;

an act of the declarative framework selecting one of the plurality of candidate class objects for each tag, each selected class object having properties that match the one or more parameters defined in the corresponding tag;

an act of the declarative framework automatically mapping the parameters in each of the tags to the corresponding selected class object; and an act of automatically binding the properties of the selected class object to the parameters of the corresponding tag based on one or more declarative rules associated with the properties.

* * * * *

UNITED STATES PATENT AND TRADEMARK OFFICE
CERTIFICATE OF CORRECTION

PATENT NO. : 8,201,147 B2
APPLICATION NO. : 12/028686
DATED : June 12, 2012
INVENTOR(S) : Antony Scott Williams et al.

It is certified that error appears in the above-identified patent and that said Letters Patent is hereby corrected as shown below:

In the Specification

In column 1, line 62, before "updated" delete "as".

In column 2, line 55, before "updated" delete "as".

In column 3, line 58, after "of" delete "as".

In column 4, line 25, after "the" delete "as".

In column 5, line 25, after "Application" delete "as".

In column 5, line 58, after "framework" delete "as".

In column 6, line 25, after "are" delete "as".

In column 6, line 61, after "other" delete "as".

In column 7, line 28, after "functionality" delete "as".

In column 7, line 61, after "be" delete "as".

In column 8, line 29, after "a" delete "as".

In column 8, line 64, after "those" delete "as".

In column 9, line 29, after "125" delete "as".

In column 9, line 65, after "using" delete "as".

In column 10, line 26, delete "diffing" and insert -- differing --, therefor.

Signed and Sealed this
Twenty-fourth Day of February, 2015

Michelle K. Lee
*Deputy Director of the United States Patent and Trademark Office*

CERTIFICATE OF CORRECTION (continued)
U.S. Pat. No. 8,201,147 B2

In the Claims

In column 11, lines 54-56, In Claim 12, after "12." delete "The method of claim1, further comprising building a full object graph of the class objects identified for each tag of the declarative language application description, including)".

In column 12, lines 26-28, In Claim 14, after "14." delete "The method of claim1, further comprising building a full object graph of the class objects identified for each tag of the declarative language application description, including)".